United States Patent [19]

Ohashi et al.

[11] 4,296,170
[45] Oct. 20, 1981

[54] FIREPROOF LAMINATES

[75] Inventors: Takashi Ohashi, Iruma; Toru Okoyama, Sagamihara; Katsuhiko Arai, Akigawa, all of Japan

[73] Assignee: Bridgestone Tire Company Limited, Tokyo, Japan

[21] Appl. No.: 127,669

[22] Filed: Mar. 6, 1980

[30] Foreign Application Priority Data

Mar. 6, 1979 [JP] Japan .................................. 54/26042

[51] Int. Cl.³ .............................................. B32B 5/20
[52] U.S. Cl. .................. 428/313; 428/422.8; 428/920; 428/921
[58] Field of Search ............... 521/902; 428/313, 315, 428/464, 465, 920, 921, 422.8

[56] References Cited

U.S. PATENT DOCUMENTS

| | | | |
|---|---|---|---|
| 2,226,589 | 12/1940 | Smyers | 428/461 |
| 2,728,702 | 12/1955 | Simon et al. | 156/79 |
| 3,814,659 | 6/1974 | Nadeau | 428/313 |
| 3,940,517 | 2/1976 | De Leon | 156/78 |
| 4,118,533 | 10/1978 | Hipchen | 428/303 |
| 4,121,958 | 10/1978 | Koonts | 428/314 |
| 4,131,518 | 12/1978 | Fromson | 428/464 |
| 4,148,980 | 4/1979 | Narayan | 521/902 |
| 4,165,414 | 8/1979 | Narayan et al. | 521/902 |
| 4,166,164 | 8/1979 | Cenker et al. | 521/902 |
| 4,205,136 | 5/1980 | Ohashi et al. | 521/902 |

FOREIGN PATENT DOCUMENTS 900876 7/1962 United Kingdom ................ 428/315

OTHER PUBLICATIONS

UK Patent Application, GB 2,007,590 A, published May 23, 1979.

*Primary Examiner*—William J. Van Balen
*Attorney, Agent, or Firm*—Sughrue, Mion, Zinn, Macpeak & Seas

[57] ABSTRACT

A fireproof laminate passing Grade 2 incombustibility according to Japanese Industrial Standard (JIS) A-1321 combustion test is disclosed. The laminate comprises a urethane modified polyisocyanurate foam as a core material and an aluminum foil with a thickness of not less than 0.015 mm as a front surface material piled on the foam through self-adhesion of the foam. When the foam is produced by reacting an organic polyisocyanate with polyols as a modifier in the presence of an isocyanate trimerization catalyst, a blowing agent and other additives, a combination of particular low molecular weight diols with particular high molecular weight polyols is used as the polyol in a special weight ratio and a special total amount per 100 parts by weight of the organic polyisocyanate.

11 Claims, No Drawings

FIREPROOF LAMINATES

This invention relates to novel fireproof laminates using a urethane modified polyisocyanurate foam as a core material. More particularly, it relates to fireproof laminates having excellent fireproof property and low-smoke development, which are obtained by using a core material composed of a urethane modified polyisocyanurate foam, which is formed by using a particular combination of particular polyols as a modifier, and a surface material of an aluminum foil having a defined thickness and piling them one upon another through self-adhesion of the urethane modified polyisocyanurate foam.

The fireproof laminates according to the invention are characterized by having a fireproof property passed Grade 2 incombustibility (quasi-incombustible material) in a test for incombustibility of internal finish materials for buildings according to Japanese Industrial Standard (JIS) A-1321.

Recently, demands for weight-saving, easiness of processability, thermal insulating property and the like in building materials are promptly elevated with the high rising and assembling of buildings. Furthermore, flameproofing regulation for the building materials becomes strengthened with the increase of dangers in the firing. Moreover, the use of quasi-incombustible materials is not only obligated in given sections of detached house, multiple dwelling house and the like by the building regulation, but also abruptly increases in other sections.

As the building materials such as ceiling material, wall material and others, there have hitherto been used ones obtained by using woody part, gypsum or the like as a core material and piling a decorative paper, iron plate or other surface material on a side thereof through an adhesive. However, such building materials are large in the specific gravity and heavy in the weight even in the case of using them as quasi-incombustible material, so that they have such drawbacks that the processability is poor, the thermal insulating property is low, the hygroscopicity is large and the dimensional stability changes considerably with time.

Lately, there have been proposed building materials manufactured by using as a substrate a foamable resin for rigid polyurethane foam, polyisocyanurate foam or the like, which are advantageous in the thermal insulating property and weight-saving, admixing or filling the foamable resin layer with a great amount of a flame retardant, a smoke-suppressing agent, inorganic granules or the like, and laminating the foam as a core material with a relatively thick and heavy steel plate such as colored iron plate and the like as a surface material, a few of which are known as a so-called incombustible building panel. However, it can be said that these panels are unsuitable in the weight-saving and easiness of processability. On the other hand, according to JIS A-1321 "Testing method for incombustibility of internal finish material and procedure of buildings" in the recently revised building regulation, the laminates each composed of the core material and the surface material for use in the ceiling material, wall material and the like are subjected to annexed test and smoke test for toxicity of combustion gases under severe conditions as well as the conventional surface test in order to examine whether or not they pass Grade 2 incombustibility (as quasi-incombustible material). As a result, the extreme restriction for the thickness of the laminate may be required even in the case of using the above mentioned panels in order to pass the laminate through the annexed test. Therefore, these panels can hardly be said to be favorable as the building material having a good thermal insulating property.

Under the above circumstances, the inventors have made various studies with respect to the development of building materials having a light weight, a good thermal insulating property and a fireproof property of Grade 2 incombustibility and as a result, there has previously been proposed a method of producing modified polyisocyanurate foams having a fireproof property of Grade 2 incombustibility (Japanese Pat. laid open No. 125,498/78). However, the modified polyisocyanurate foams obtained by this method themselves are light-weight and have an excellent thermal insulating property, but are insufficient in the appearance, strength and dimensional stability at moisture absorption for direct use in the building material.

Now, the inventors have further made various studies with respect to laminates obtained by using the above modified polyisocyanurate foam as a core material, piling a light-weight decorative paper, sheet or film of plastics such as vinyl chloride resin and the like, mineral paper such as asbestos paper and the like, or an aluminum foil as a surface material on the core material through self-adhesion of the modified polyisocyanurate foam. As a result, there have been proposed laminates for building materials, which improve the above mentioned drawbacks and exhibit a satisfactory fireproof property when using the aluminum foil or sheet with a thickness of not less than 0.1 mm as the surface material (Japanese patent application No. 135,614/77).

The inventors have made further investigations with respect to the processability, weight-saving, economy and the like of the above laminates and found out that the thickness of the surface material of aluminum foil can be further thinned by using a polyisocyanurate foam of a defined compounding recipe as a core material and as a result, the invention has been accomplished.

That is, the invention is to provide novel fireproof laminates useful as the building material, which are light weight and favorable in the processability and economy and have an excellent appearance as an internal finish material, a good thermal insulating property and a fireproof property of Grade 2 incombustibility according to JIS A-1321 combustion test.

According to the invention, there is provided a fireproof laminate comprising a urethane modified polyisocyanurate foam as a core material produced by reacting an organic polyisocyanate with a polyol in the presence of an isocyanate trimerization catalyst, a blowing agent and other additives, and a surface material piled on at least front surface of said core material, which comprises:

(1) using an aluminum foil with a thickness of not less than 0.015 mm as a front surface material for said core material, said front surface material being united with said core material by self-adhesion of said foam;

(2) using, as said polyol for the formation of said urethane modified polyisocyanurate foam, at least one low molecular weight diol (hereinafter referred to as A-group diol) selected from the group consisting of (a) compounds having the general formula

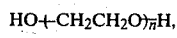

wherein n is 2, 3 or 4, (b) compounds having the general formula $$HO+CH_2CHO\!\!+\!\!_{\overline{n}}H,$$
$$|$$
$$CH_3$$

wherein n is 2 or 3, (c) 2,3-butane diol and (d) 2-butene-1,4-diol together with at least one high molecular weight polyol (hereinafter referred to as B-group polyol) having 2 to 4 hydroxyl groups in its molecule and a hydroxyl equivalent of 600 to 2,000;

(3) being a weight ratio of the sum of A-group diols to the sum of B-group polyols within a range of 0.55 to 7.0; and (4) being a total amount of A-group diols and B-group polyols used as said polyol within a range of 12.5 to 25 parts by weight per 100 parts by weight of said organic polyisocyanate.

According to the invention, it makes possible to provide fireproof laminates having a very light weight and excellent thermal insulating property, processability, appearance, economy and the like and exhibiting a fireproof property capable of passing Grade 2 incombustibility according to JIS A-1321 combustion test, which are useful as the building material, by using a particular combination of the defined polyols as the modifier in the formation of the urethane modified polyisocyanurate foam to be used as the core material even when the light-weight and very thin aluminum foil is used as the front surface material. This fact is never anticipated from the prior art and is epochmaking evidently.

The invention will be described in greater detail below.

As the polyol, which is a modifier in the formation of the urethane modified polyisocyanurate foam to be used as the core material according to the invention, it is necessary to use a combination of A-group diol and B-group polyol as defined above under particular conditions.

The A-group diol is at least one low molecular weight diol selected from the group consisting of (a) diethylene glycol, triethylene glycol and tetraethylene glycol of the general formula $$HO+CH_2CH_2O\!\!+\!\!_{\overline{n}}H$$

wherein n is 2, 3 or 4, (b) dipropylene glycol and tripropylene glycol of the general formula $$HO+CH_2CHO\!\!+\!\!_{\overline{n}}H$$
$$|$$
$$CH_3$$

wherein n is 2 or 3, (c) 2,3-butane diol and (d) 2-butene-1,4-diol. When the low molecular weight diol other than the above defined diols is used together with the particular high molecular weight polyol to form the urethane modified polyisocyanurate foam as the core material and the surface material of aluminum foil is piled thereon, the resulting laminate cannot pass Grade 2 incombustibility.

The B-group polyol to be used together with the A-group diol is at least one polyol having 2 to 4 hydroxyl groups in its molecule and a hydroxyl equivalent of 600 to 2,000. When using the polyol other than the above defined polyols, there cannot also be obtained laminates capable of passing Grade 2 incombustibility. The B-group polyol includes polyether polyols and polyester polyols. As the polyetherpolyol, mention may be made of polyoxyalkylene glycols obtained, for example, by reacting ethylene oxide, propylene oxide, butylene oxide or a mixture thereof with a diol such as ethylene glycol, 1,2-propylene glycol, 1,3-propane diol, 1,4-butane diol, 2,3-butane diol, 1,5-pentane diol, 1,2-hexane diol, diethylene glycol and dipropylene glycol; polyoxyalkylene triols or polyoxyalkylene tetraols obtained by reacting ethylene oxide, propylene oxide, butylene oxide or a mixture thereof with a triol or tetraol such as glycerin, trimethylol propane, 1,2,6-hexane triol and pentaerythritol; polytetramethylene glycol and the like. As the polyester polyol, mention may be made of ones having hydroxyl groups at terminals thereof and obtained by polycondensation reaction of an aliphatic carboxylic acid such as malonic acid, succinic acid, adipic acid, pimelic acid, sebacic acid and the like or an aromatic carboxylic acid such as phthalic acid and the like or a mixture thereof with an aliphatic glycol such as ethylene glycol, propylene glycol, butylene glycol, diethylene glycol and the like or a triol such as trimethylol propane and the like; ones having hydroxyl groups at terminals thereof such as polycaprolactone obtained by ring opening polymerization of lactone, and the like.

According to the invention, the weight ratio of low molecular weight diol to high molecular weight polyol should be within a range of $$\frac{\text{sum of } A\text{-group diols used}}{\text{sum of } B\text{-group polyols used}} = 0.55 \sim 7.0$$

and the total amount of A-group diols and B-group polyols used should be within a range of 12.5 to 25 parts by weight per 100 parts by weight of the organic polyisocyanate. When the weight ratio and total amount are beyond the above defined ranges, even if the core material is laminated with the surface material according to the invention, the resulting laminates hardly pass Grade 2 incombustibility.

Moreover, the preferred weight ratio of the sum of A-group diols to the sum of B-group polyols is within a range of 1.0 to 5.0 and the preferred total amount of A-group diols and B-group polyols used as the polyol is within a range of 14 to 22 parts by weight per 100 parts by weight of the organic polyisocyanate. In such preferred ranges, it makes possible to produce laminates having more improved fireproof property.

The organic polyisocyanate according to the invention means an organic compound having two or more isocyanate groups in its molecule and includes aliphatic polyisocyanates, aromatic polyisocyanates, mixtures and modified substances thereof. As the aliphatic polyisocyanate, mention may be made of hexamethylene diisocyanate, isophorone diisocyanate, dicyclohexylmethane diisocyanate, methylcyclohexane diisocyanate and the like. As the aromatic polyisocyanate, mention may be made of tolylene diisocyanate (2,4- and/or 2,6-isomers), diphenylmethane diisocyanate, bitolylene diisocyanate, naphthalene diisocyanate (e.g., 1,5-naphthalene diisocyanate), triphenylmethane triisocyanate, dianisidine diisocyanate, xylylene diisocyanate, tris-(isocyanate phenyl) thiophosphate, polymethylenepolyphenyl isocyanate having the following formula

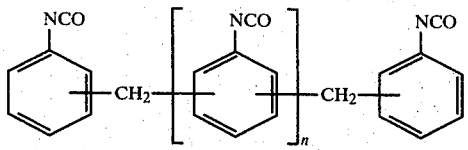

wherein n is 0 or an integer of 1 or more (so-called crude MDI or polymeric isocyanate) obtained by reacting a low polycondensate of aniline and formaldehyde with phosgene, undistilled tolylene diisocyanate and the like. Further, prepolymers having two or more isocyanate groups, which are obtained by any conventional method, for example, prepolymers having an urethane group, a biuret group, an isocyanurate group, a carbodiimide group, an oxazolidone group or the like may be used. These polyisocyanates may be used alone or in admixture of two or more polyisocyanates. As the organic polyisocyanate, the aromatic polyisocyanates, particularly polymethylene-polyphenyl isocyanates are preferable in view of flameproofing and thermal insulating property.

In the formation of the core material, there may be used any of well-known isocyanate trimerization catalysts, typical examples of which are as follows:
(1) Tertiary amino compounds, such as dialkylaminoalkyl phenols (e.g., 2,4,6-tris(dimethylaminomethyl) phenol and so on), triethylamine, N,N',N''-tris(dimethylaminoalkyl)-hexahydrotriazines, tetraalkylalkylene diamines, dimethylethanol amine, diazabicyclooctane or its lower alkyl substituted derivatives and the like;
(2) Combinations of tertiary amines with cocatalysts; As the cocatalyst, mention may be made of ethyl alcohol, mono-substituted carbamic acid, esters, aldehydes, alkylene oxides, alkylene imines, ethylene carbonate, 2,3-butanedione and the like.
(3) Tertiary alkyl phosphines;
(4) Alkali metal salts of imides, such as potassium phthalimide and the like;
(5) Onium compounds, such as quaternary onium hydroxyl compounds of nitrogen, phosphorus, arsenic or antimony, onium hydroxyl compounds of sulfur or selenium and the like;
(6) Alkyl substituted ethyleneimines, such as N-methyl ethyleneimine, phenyl-N,N-ethylene urea and the like;
(7) Metal salts of carboxylic acids, such as potassium acetate, potassium 2-ethyl hexanoate, lead 2-ethyl hexanoate, sodium benzoate, potassium naphthenate, potassium caprylate and the like;
(8) Oxides, hydroxides, carbonates, enolic compounds and phenolic compounds of alkali metals or alkaline earth metals;
(9) Epoxy compounds;
(10) Combinations of epoxy compounds with cocatalysts; As the cocatalyst, mention may be made of tertiary amines, metal salts of aromatic secondary amines such as sodium salt of diphenylamine and the like;
(11) Various metal salts, such as stannous octanoate, titanium tetrabutyrate, tributyl antimony oxide and the like;
(12) Friedel-Crafts catalysts, such as aluminum chloride, boron trifluoride and the like; and
(13) Chelate compounds of alkali metals, such as sodium salicylaldehyde and the like.

These catalysts may be used alone or in an admixture thereof, but the alkali metal salt of carboxylic acids having a carbon number of 2-12 or the combination with the tertiary amino compound thereof is preferably used in view of a catalytic activity, a compatibility with the polyol and the like.

The amount of the isocyanate trimerization catalyst used is preferably 0.5-10% by weight per the organic polyisocyanate in view of the catalytic activity.

According to the invention, all of blowing agents used in the production of conventional polyurethane foams and polyisocyanurate foams may be used. For instance, the blowing agent includes carbon dioxide gas generated by adding water to the reaction mixture or supplied from an external source, nitrogen gas and a mixture thereof. However, the preferred blowing agent is a low-boiling inert solvent evaporating by a heat of reaction in the foaming process. Such a solvent is a fluorinated and/or chlorinated hydrocarbon having a good compatibility, a typical example of which includes trichloromonofluoromethane, dichlorodifluoromethane, dichloromonofluoromethane, monochlorodifluoromethane, dichlorotetrafluoroethane, 1,1,2-trichloro-1,2,2-trifluoroethane, methylene chloride, trichloroethane and the like. Further, benzene, toluene, pentane, hexane and so on may be used. These blowing agents may be used alone or in an admixture thereof. Among them, trichloromonofluoromethane is preferable as the blowing agent in view of the foam properties, easiness of foam forming process and the like.

The addition amount of the blowing agent should be controlled so as to maintain the density of the urethane modified polyisocyanurate foam as the core material at a predetermined value. For this end, the blowing agent is usually used in an amount of about 10-40% by weight per foam forming composition.

In addition, to the above mentioned ingredients, a surfactant, a modifier and other additives may be added, if necessary.

As the surfactant, use may be made of any ones usually used in the production of polyurethane foams, an example of which includes an organosilicone surfactant such as organopolysiloxane-polyoxyalkylene copolymer, polyalkenyl siloxane having a side chain of polyoxyalkylene and the like. Further, oxyethylated alkyl phenol, oxyethylated aliphatic alcohol, ethylene-propylene oxide block polymer and so on are effective as the surfactant. The surfactant is usually used in an amount of about 0.01-5 parts by weight per 100 parts by weight of the organic polyisocyanate.

As the other additive, there are inorganic hollow particles, granulated refractory, fibrous materials, inorganic fillers and the like, which are used for improving the foam properties such as hardness and the like. The inorganic filler includes mice powder, finely divided clay, asbestos, calcium carbonate, silica gel, aluminum hydroxide, calcium hydroxide, magnesium hydroxide, gypsum, sodium silicate and the like.

Moreover, a flame retardant may be added without deviating the effect of the invention. According to the invention, the flame retardant usually used in the common polyurethane foam and urethane modified polyisocyanurate foam is effective and includes, for example, halogenated organic phosphorus compounds such as tris(chloroethyl) phosphate, tris(dichloropropyl) phosphate, tris(dibromopropyl) phosphate and the like; and inorganic flame retardant such as antimony oxide and the like.

As the front surface material to be piled on the urethane modified polyisocyanurate foam, it is essential to use an aluminum foil with a thickness of not less than 0.015 mm. When the thickness of the aluminum foil is thicker than the above value, there are provided laminates satisfying all objects of the invention and capable of developing a peculiar effect.

Namely, when using the aluminum foil with a thickness of less than 0.015 mm, the fireproof property is sufficient, but the appearance of the resulting laminate is considerably poor, so that this laminate is hardly said to be a practical building material. Therefore, the use of the aluminum foil having a thickness of less than 0.015 mm cannot achieve the object of the invention providing the building material having a light weight, good appearance, thermal insulating property, processability and economy and an excellent fireproof property capable of passing Grade 2 incombustibility according to JIS A-1321 combustion test. On the other hand, as the thickness of the aluminum increases, the fireproof property is further improved, but the processability and economy become poor, so that the aluminum foil having a thickness of up to about 0.2 mm is preferably used in view of practical uses.

In other words, the thickness of the aluminum foil to be used in the invention is within a range of 0.015 to 0.2 mm, preferably 0.02 to 0.7 mm in view of weight-saving, appearance and economic reasons. It can be said that the peculiar effect is more developed in the above defined range.

As the aluminum foil, use may be made of any ones commercially available in the market, which are united with the core material by self-adhesion of the urethane modified polyisocyanurate foam as mentioned above. Further, the outer surface of the aluminum foil may be subjected to various decorations by painting, printing and the like if necessary, so as not to damage the fireproof property, or may be covered with a fabricated article previously embossed, painted or printed. Moreover, in order to improve the adhesive property between the core material and the aluminum foil, a primer or the like may be used without loss of the fireproof property.

According to the invention, a back surface material may not be used in the back side of the core material. However, it is favorable to use the back surface material considering the deterioration of the laminate with lapse of time and the like. As the back surface material, use may be made of a metal foil such as aluminum foil or the like, a non-combustible paper such as asbestos paper or the like, a plastic film and so on. Among them, the metal foil is preferable in view of the hygroscopicity, fireproof property and the like. Moreover, in the laminates according to the invention, the laminate thickness and foam density are not critical, but it is preferable to have a laminate thickness of 10–30 mm and a foam density of 0.02–0.04 g/cm$^3$ in view of the thermal insulating property, weight-saving and economic reasons.

The reason why the laminates according to the invention develop an excellent fireproof property as Grade 2 incombustibility according to JIS A-1321 combustion test is gussed as follows. That is, when the laminate composed of the combination of the urethane modified polyisocyanurate foam as the core material and the aluminum foil as the front surface material according to the invention is subjected to a surface test according to JIS A-1321 combustion test, even if the surface material is easily fused to expose the core material, there is generated no crack causing the enlargement of lingering flame, which has been observed in the conventional urethane modified polyisocyanurate foams without exception, so that the char formation is sufficiently caused on the surface of the core material. As a result, the increase of fuming quantity and enlargement of lingering flame, which are serious problems in the conventional laminates, can be suppressed and the fireproof property is further improved. Furthermore, when the laminate according to the invention is subjected to an annexed test, there are caused the phenomena similar to those described above, whereby the excellent fireproof property is developed. In other words, it can be said that even when the laminate according to the invention includes the aluminum foil which being very thin and being apt to be fused by heating, the fireproof property capable of passing Grade 2 incombustibility considerably results from the excellent fireproof property of the urethane modified polyisocyanurate foam according to the invention formed by using the particular polyol as the modifier and the synergistic action of the foam with the aluminum foil of the defined thickness to be used in the invention.

The production of the laminate according to the invention can be carried out by any well-known processes. For instance, the polyol as a urethane modifier, catalyst and blowing agent are mixed with stirring by adding a foam stabilizer and other additives, if necessary, to form a homogeneous solution, to which is added the organic polyisocyanate with stirring, whereby a foam forming composition is obtained. Then, the foam forming composition is foamed in a predetermined space, which corresponds to the final laminate thickness, of a mold or double conveyor belt having a surface material therein so as to form a laminate of the core material and surface material through the self-adhesion of the resulting urethane modified polyisocyanurate foam. Moreover, the core material may be bonded to the surface material with an adhesive without loss of the fireproof property. In the latter case, a great care must be taken in the selection of the adhesive.

As mentioned above, the laminates according to the invention are light weight, excellent in the thermal insulating property, processability and economy and have an excellent fireproof property passing Grade 2 incombustibility according to JIS A-1321 combustion test, so that they are advantageously applicable to various building parts for housing, building and the like.

The following examples are given in illustration of the invention with comparative examples and are not intended as limitations thereof. In the examples, all parts and percents are by weight, unless otherwise stated.

Moreover, the effect of the invention is decided on a basis of whether or not the laminate passes Grade 2 incombustibility according to JIS A-1321 combustion test. The surface test according to JIS A-1321 is carried out by placing a test piece with a length and width of 22 cm × 22 cm and an actual thickness in a heating furnace and then heating a surface of the test piece for a predetermined period using gas as a sub-heat source and an electric heater as a main heat source. Thereafter, the presence and degree of crack/deformation, time of lingering flame after the completion of heating, heat release value (temperature time area, ° C. × min.) calculated from the difference between the exhaust temperature curve of the test piece and the reference curve of perlite plate as a standard material, and fuming factor calculated from maximum fuming quantity are measured to judge the fireproof property of the test piece on a basis of acceptable standard values shown in the following Table 1.

Further, the annexed test of the laminate is carried out under the same conditions as described above, except that three holes of 2.5 cm diameter are pierced from front of the test piece to rear side thereof in place. In this case, the evaluation of the term "crack/deformation" is omitted.

TABLE 1

Test
Acceptable standard values of Grade 2 incombustibility (quasi-incombustible material) according to JIS A-1321 combustion test
Item

| Class | Heat release value (°C. × min.) | Fuming factor | Time of lingering flame (sec.) | Crack/deformation |
|---|---|---|---|---|
| Surface test | not more than 100 | not more than 60 | not more than 30 | no harmful degree |
| Annexed test | not more than 150 | not more than 60 | not more than 90 | — |

EXAMPLES 1–2

Laminates were manufactured by using the compounding recipe of the following Table 2 in a production process as mentioned below.

TABLE 2

| Ingredients | Parts by weight |
|---|---|
| Crude diphenylmethane diisocyanate (1) | 100 |
| Polypropylene glycol (2) | 7.57 |
| Solution of 33 wt. % potassium acetate in diethylene glycol (3) | 1.2 |
| Diethylene glycol (4) | 8.8 |
| 2,4,6-tris(dimethylaminomethyl) phenol (5) | 0.5 |
| L-5340 (6) | 1.0 |
| Trichloromonofluoromethane (7) | 28 |

Weight ratio of low molecular weight diols to high molecular weight polyols = 1.27
Total amount of polyols used (parts by weight) = 17.17
Note:
(1) Sumidur 44 V-20 (trade name) made by Sumitomo Bayer Urethane Co., Ltd.; isocyanate equivalent = 137
(2) PP-2000 (trade name) made by Sanyo Kasei Kogyo Co., Ltd.; hydroxyl equivalent = 1,000
(3) The solution is abbreviated as AcOK/DEG hereinafter.
(4) The compound is abbreviated as DEG hereinafter.
(5) made by Rohm & Haas Co., Ltd.; hereinafter
(6) organopolysiloxane-polyoxyalkylene copolymer, made by Nippon Unicar Co., Ltd.
(7) The compound is abbreviated as F-11 hereinafter.

The laminate with a total thickness of 20 or 25 mm was manufactured by using the urethane modified polyisocyanurate foam made from the compounding recipe of Table 2 as a core material, an aluminum foil of 0.03 mm thick as a front surface material and an aluminum foil of 0.03 mm thick as a back surface material. First of all, the front surface material of the aluminum foil with 36 cm of length and width each was set in an aluminum mold of 36 cm of length and width each and heated to about 60° C. While, the back surface material of the aluminum foil was placed in an upper mold cover having the same size as described above and heated to about 60° C.

The ingredients other than the crude diphenylmethane diisocyanate in Table 2 were weighed in a stainless beaker of 500 ml capacity and thoroughly mixed to form a homogeneous solution. To this solution was added the crude diphenylmethane diisocyanate separately weighed in a stainless beaker of 200 ml capacity and then the resulting mixture was immediately stirred at a high speed for about 6 seconds to obtain a foam forming composition. Then, the composition was cast into the aluminum mold, on which was then placed the upper mold cover through a spacer of 20–25 mm thick in compliance with the total thickness of the laminate and fixed thereto by means of a clamp. After the completion of the foaming, the assembly was heated in an oven at a temperature of about 70° C. for 20 minutes to effect the curing and then the resulting laminate was taken out from the assembly.

The thus obtained laminate was examined according to JIS A-1321 combustion test to obtain a result relating to the fireproof property of Grade 2 incombustibility as shown in the following Table 3. It can be seen from Table 3 that the laminate according to the invention has a fireproof property passing Grade 2 incombustibility.

TABLE 3

| | | Example 1 | | Example 2 | |
|---|---|---|---|---|---|
| Total thickness of laminate (mm) | | 20 | | 25 | |
| | Class | surface test | annexed test | surface test | annexed test |
| | Foam density (g/cm$^3$) | 0.0306 | 0.0301 | 0.0289 | 0.0295 |
| JIS-A-1321 combustion test | Heat Release value (Td$\theta$) | 0 | 0 | 0 | 0 |
| | Fuming factor (C$_A$) | 30.2 | 36.9 | 36.6 | 40.2 |
| | Crack/deformation | none/small | — | none/small | — |
| | Time of lingering flame (sec.) | 0 | 21 | 24 | 29 |
| | Judgement | | acceptable | | acceptable |

EXAMPLES 3–5, COMPARATIVE EXAMPLE 1

Laminates with a total thickness of 25 mm were manufactured in the same manner as described in Example 1 by using the same front and back surface materials as used in Example 1 and changing the compounding recipe for the formation of urethane modified polyisocyanurate foam as the core material.

In the following Table 4 are shown the compounding recipe of the core material and evaluation results relating to Grade 2 incombustibility according to JIS A-1321 combustion test.

From these results, it can be seen that the laminates using the compounding recipe of the core material according to the invention are fairly superior in the fireproof property to that using no compounding recipe according to the invention.

TABLE 4(a)

| | Example 3 | | Example 4 | |
|---|---|---|---|---|
| | PP-2000 | 10.77 | PP-2000 | 2.99 |

TABLE 4(a)-continued

| | | | | | |
|---|---|---|---|---|---|
| Compounding recipe (parts by weight) | dipropylene glycol<br>AcOK/DPG 8)<br>DMP-30<br>L-5340 | 4.8<br>2.0<br>0.5<br>1.0 | DEG<br>AcOK/DEG<br>DMP-30<br>L-5340 | 13.38<br>1.2<br>0.5<br>1.0 | |
| Weight ratio of low molecular weight diols to high molecular weight polyols | | 0.59 | | 4.74 | |
| Total amount of polyols used | | 17.17 | | 17.17 | |
| JIS-A-1321 combustion test | Class<br>Foam density (g/cm³)<br>Heat release value (Tdθ) | surface test<br>0.0320<br>0 | annexed test<br>0.0319<br>0 | surface test<br>0.0282<br>0 | annexed test<br>0.0280<br>0 |
| | Fuming factor ($C_A$) | 9.9 | 47.4 | 0.6 (no fusing of surface material) | 37.2 |
| | Crack/deformation<br>Time of lingering flame (sec.) | none/small<br>0 | —<br>29 | none/small<br>0 | —<br>20 |
| | Judgement | acceptable | | acceptable | |

TABLE 4(b)

| | | Example 5 | | Comparative Example 1 | |
|---|---|---|---|---|---|
| Compounding recipe (parts by weight) | | FA-702 (9)<br>DEG<br>AcOK/DPG<br>DMP-30<br>L-5340 | 7.57<br>8.8<br>1.2<br>0.5<br>1.0 | PP-2000<br>AcOK/DPG<br>DMP-30<br>SH-193 (10) | 13.97<br>4.0<br>2.0<br>1.0 |
| Weight ratio of low molecular weight diols to high molecular weight polyols | | 1.27 | | 0.23 | |
| Total amount of polyols used | | 17.17 | | 17.17 | |
| JIS-A-1321 combustion test | Class<br>Foam density (g/cm³)<br>Heat release value (Tdθ)<br>Fuming factor ($C_A$)<br>Crack/deformation<br>Time of lingering flame (sec.) | surface test<br>0.0290<br>0<br>33.3<br>none/small<br>25 | annexed test<br>0.0286<br>0<br>39.0<br>—<br>31 | surface test<br>0.0307<br>0<br>63.0<br>none/small<br>74 | annexed test<br>0.0292<br>51.3<br>54.9<br>—<br>24 |
| | Judgement | acceptable | | unacceptable | |

Note:
Common compounding conditions
F-11: 26
Sumidur 44V-20: 100
(8) Solution of 20% potassium acetate in dipropylene glycol, this DPG is included in the low molecular weight diol.
(9) pentaerythritol-based ethylene oxide-propylene oxide andition polyol, hydroxyl equivalent 1516, made by Sanyo Kasei Kogyo Co., Ltd.
(10) organopolysiloxane-polyoxyalkylene copolymer, made by Toray Silicone Co., Ltd.

EXAMPLES 6–7, COMPARATIVE EXAMPLES 2–3

Laminates with a total thickness of 25 mm were manufactured in the same manner as described in Example 1 by using aluminum foils with a thickness of 0.05 mm as the front and back surface materials and changing the compounding recipe for the formation of urethane modified polyisocyanurate foam as the core material. Moreover, the front surface material of Example 6 was subjected to a painting.

In the following Table 5 are shown the compounding recipe of the core material and evaluation results relating to Grade 2 incombustibility according to JIS A-1321 combustion test.

From these results, it can be seen that the laminates according to the invention are fairly superior in the fireproof property to those using no compounding recipe according to the invention.

TABLE 5(a)

| | | Example 6 | | Example 7 | |
|---|---|---|---|---|---|
| Compounding recipe (parts by weight) | | the same as used in Example 1 | | PTG-500 (11)<br>DEG<br>AcOK/DEG<br>DMP-30<br>L-5340<br>F-11 | 7.57<br>8.8<br>1.2<br>0.5<br>1.0<br>26 |
| Weight ratio of low molecular weight diols to high molecular weight polyols | | 1.27 | | 1.27 | |
| Total amount of polyols used | | 17.17 | | 17.17 | |
| JIS-A-1321 | Class<br>Foam density (g/cm³)<br>Heat release value (Tdθ) | surface test<br>0.0287<br>0 | annexed test<br>0.0298<br>0 | surface test<br>0.0293<br>0 | annexed test<br>0.0300<br>0 |

TABLE 5(a)-continued

|  | | Example 6 | | Example 7 | |
|---|---|---|---|---|---|
| combustion test | Fuming factor ($C_A$) | 3.3 (no fusing of surface material) | 38.1 | 1.2 (no fusing of surface material) | 46.2 |
|  | Crack/deformation | none/small | | none/small | |
|  | Time of lingering flame (sec.) | 0 | 34 | 0 | 42 |
|  | Judgement | | acceptable | | acceptable |

TABLE 5(b)

|  |  | Comparative Example 2 | | Comparative Example 3 | |
|---|---|---|---|---|---|
|  | Compounding recipe (parts by weight) | PP-2000  13.97<br>AcOK/DPG  4.0<br>Polycat 41 (12)  0.5<br>SH-192 (13)  1.0<br>F-11  28 | | T-1500  13.67<br>AcOK/DPG  4.0<br>Polycat 41  0.5<br>SH-193  1.0<br>F-11  26 | |
| Weight ratio of low molecular weight diols to high molecular weight polyols | | 0.23 | | 0.23 | |
| Total amount of polyols used | | 17.17 | | 16.87 | |
|  | Class | surface test | annexed test | surface test | annexed test |
|  | Foam density (g/cm³) | 0.0288 | 0.0293 | 0.0348 | 0.0336 |
| JIS-A-1321 combustion test | Heat release value ($Td\theta$) | 0 | 0 | 116.3 | 51.3 |
|  | Fuming factor ($C_A$) | 63.6 | 60.6 | 101.1 | 78.6 |
|  | Crack/deformation | none/small | | none/small | |
|  | Time of lingering flame (sec.) | 34 | 50 | 30 | 58 |
|  | Judgement | | unacceptable | | unacceptable |

Note:
Common compounding conditions
Sumidur 44V-20: 100
Paint for the front surface material of Example 6 about 0.03 mm coating of acryl lacquer (black) Airrock, made by Rock Paint Co., Ltd.
(11) polytetramethylene glycol, hydroxyl equivalent 1000, made by Nippon Polyurethane Co., Ltd.
(12) N,N′,N″-tris(dimethylaminopropyl)sym . hexahydrotriazine, made by Abbot Laboratories.
(13) made by Nippon Unicar Co., Ltd., organopolysiloxane-polyoxyalkylene copolymer

EXAMPLES 8-13

Laminates with a total thickness of 20 mm were manufactured in the same manner as described in Example 1 by using an aluminum foil of 0.03 mm thick coated with a paint (Airrock, made by Rock Paint Co., Ltd., cream) as the front surface material and an aluminum foil of 0.03 mm thick as the back surface material and changing the compounding recipe for the formation of urethane modified polyisocyanurate foam as the core material.

In the following Table 6 are shown the compounding recipe of the core material, the coating thickness and evaluation results relating to Grade 2 incombustibility according to JIS A-1321 combustion test.

TABLE 6(a)

|  |  | Example 8 | | Example 9 | |
|---|---|---|---|---|---|
|  | Compounding recipe (parts by weight) | PP-2000  10.77<br>DPG  4.8<br>AcOK/DPG  2.0 | | PP-2000  7.57<br>DPG  8.0<br>AcOK/DPG  2.0 | |
| Weight ratio of low molecular weight diols to high molecular weight polyols | | 0.59 | | 1.27 | |
| Total amount of polyols used | | 17.17 | | 17.17 | |
| Coating thickness (mm) | | 0.017 | 0.018 | 0.021 | 0.021 |
|  | Class | surface test | annexed test | surface test | annexed test |
|  | Foam density (g/cm³) | 0.0343 | 0.0339 | 0.0322 | 0.0320 |
| JIS-A-1321 combustion test | Heat release value ($Td\theta$) | 0 | 0 | 0 | 0 |
|  | Fuming factor ($C_A$) | 37.2 | 40.8 | 33.0 | 38.8 |
|  | Crack/deformation | none/small | | none/small | |
|  | Time of lingering flame (sec) | 25 | 28 | 18 | 31 |
|  | Judgement | | acceptable | | acceptable |

TABLE 6(b)

|  | Example 10 | | Example 11 | |
|---|---|---|---|---|
| Compounding recipe (parts by weight) | PTG-500  7.57<br>DEG  8.8<br>AcOK/DEG  1.2 | | PP-2000  2.99<br>DEG  13.38<br>AcOK/DEG  1.2 | |
| Weight ratio of low molecular weight | | | | |

TABLE 6(b)-continued

|  |  | Example 10 |  | Example 11 |  |
|---|---|---|---|---|---|
| diols to high molecular weight polyols |  | 1.27 |  | 4.74 |  |
| Total amount of polyols used |  | 17.17 |  | 17.17 |  |
| Coating thickness (mm) |  | 0.026 | 0.021 | 0.020 | 0.024 |
|  | Class | surface test | annexed test | surface test | annexed test |
|  | Foam density (g/cm³) | 0.0303 | 0.0306 | 0.0295 | 0.0290 |
| JIS-A-1321 combustion test | Heat release value (Td$\theta$) | 0 | 0 | 0 | 0 |
|  | Fuming factor ($C_A$) | 35.5 | 50.7 | 0 (no fusing of surface material | 45.3 |
|  | Crack/deformation | none/small |  | none/small |  |
|  | Time of lingering flame (sec.) | 23 | 45 | 0 | 34. |
|  | Judgement |  | acceptable |  | acceptable |

TABLE 6(c)

|  |  | Example 12 |  | Example 13 |  |
|---|---|---|---|---|---|
| Compounding recipe (parts by weight) |  | PP-2000 | 7.57 | FA-702 | 7.57 |
|  |  | DEG | 4.0 | DEG | 8.8 |
|  |  | tripropylene glycol | 4.8 | AcOK/DEG | 1.2 |
|  |  | AcOK/DEG | 1.2 |  |  |
| Weight ratio of low molecular weight diols to high molecular weight polyols |  | 1.27 |  | 1.27 |  |
| Total amount of polyols used |  | 17.17 |  | 17.17 |  |
| Coating thickness (mm) |  | 0.018 | 0.018 | 0.029 | 0.028 |
|  | Class | surface test | annexed test | surface test | annexed test |
|  | Foam density (g/cm³) | 0.0318 | 0.0316 | 0.0305 | 0.0303 |
| JIS-A-1321 combustion test | Heat release value (Td$\theta$) | 0 | 0 | 0 | 0 |
|  | Fuming factor ($C_A$) | 27.9 | 39.6 | 27.6 | 46.2 |
|  | Crack/deformation | none/small |  | none/small |  |
|  | Time of lingering flame (sec.) | 26 | 20 | 15 | 38 |
|  | Judgement |  | acceptable |  | acceptable |

Note:
Common compounding conditions
DMP-30: 0.5
L-5340: 1.0
F-11: 26
Sumidur 44V-20: 100

What is claimed is:

1. A fireproof laminate comprising a urethane modified polyisocyanurate foam as a core material produced by reacting an organic polyisocyanate with a polyol in the presence of an isocyanate trimerization catalyst, a blowing agent and other additives, and a surface material piled on at least front surface of said core material, which comprises:

(1) using an aluminum foil with a thickness of not less than 0.015 mm as a front surface material for said core material, said front surface material being united with said core material by self-adhesion of said foam;

(2) using, as said polyol for the formation of said urethane modified polyisocyanurate foam, at least one low molecular weight diol (hereinafter referred to as A-group diol) selected from the group consisting of (a) compounds having the general formula

wherein n is 2, 3 or 4, (b) compounds having the general formula

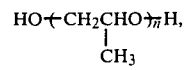

wherein n is 2 or 3, (c) 2,3-butane diol and (d) 2-butene-1,4-diol together with at least one high molecular weight polyol (hereinafter referred to as B-group polyol) having 2 to 4 hydroxyl groups in its molecule and a hydroxyl equivalent of 600 to 2,000;

(3) being a weight ratio of the sum of A-group diols to the sum of B-group polyols within a range of 0.55 to 7.0; and (4) being a total amount of A-group diols and B-group polyols used as said polyol within a range of 12.5 to 25 parts by weight per 100 parts by weight of said organic polyisocyanate.

2. A fireproof laminate as claimed in claim 1, wherein said organic polyisocyanate is an aromatic polyisocyanate.

3. A fireproof laminate as claimed in claim 1, wherein said organic polyisocyanate is a polymethylenepolyphenyl isocyanate having the following formula

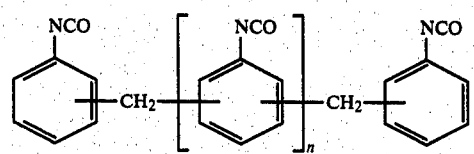

wherein n is 0 or an integer of more than 1, or a mixture thereof.

4. A fireproof laminate as claimed in claim 1, wherein said B-group polyol is selected from polyoxyalkylene glycols obtained by reacting ethylene oxide, propylene oxide, butylene oxide or a mixture thereof with a diol such as ethylene glycol, 1,2-propylene glycol, 1,3-propane diol, 1,4-butane diol, 2,3-butane diol, 1,5-pentane diol, 1,2-hexane diol, diethylene glycol and dipropylene glycol; polyoxyalkylene triols or polyoxyalkylene tetraols obtained by reacting ethylene oxide, propylene oxide, butylene oxide or a mixture thereof with a triol or tetraol such as glycerin, trimethylol propane, 1,2,6-hexane triol and pentaerythritol; and polytetramethylene glycol.

5. A fireproof laminate as claimed in claim 1, wherein said weight ratio of the sum of A-group diols to the sum of B-group polyols is 1.0 to 5.0.

6. A fireproof laminate as claimed in claim 1, wherein said total amount of A-group diols and B-group polyols used is 14 to 22 parts by weight per 100 parts by weight of said organic polyisocyanate.

7. A fireproof laminate as claimed in claim 1, wherein said isocyanate trimerization catalyst is an alkali metal salt of carboxylic acid having a carbon number of 2 to 12 alone or a combination of a tertiary amino compound therewith.

8. A fireproof laminate as claimed in claim 7, wherein said alkali metal salt of carboxylic acid having a carbon number of 2 to 12 is selected from the group consisting of potassium acetate, potassium propionate, potassium 2-ethylhexanoate, potassium caprylate and mixtures thereof.

9. A fireproof laminate as claimed in claim 7, wherein said tertiary amino compound is selected from dialkylaminoalkyl phenols such as 2,4,6-tris(dimethylaminomethyl) phenols and the like; triethylamine; triazine cyclic derivatives such as N,N',N''-tris(dimethylaminopropyl)-sym-hexahydrotriazine and the like; tetraalkylalkylene diamines; triethylenediamine and its lower alkyl substituted derivatives; and mixtures thereof.

10. A fireproof laminate as claimed in claim 1, wherein said blowing agent is a fluorinated and/or chlorinated low-boiling inert solvent.

11. A fireproof laminate as claimed in claim 1, wherein said blowing agent is trichloromonofluoromethane.

* * * * *